(12) United States Patent
Kurahashi

(10) Patent No.: US 7,042,510 B2
(45) Date of Patent: May 9, 2006

(54) SETTING OPERATION DEVICE AND ELECTRONIC APPARATUS

(75) Inventor: Sunao Kurahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 678 days.

(21) Appl. No.: 09/951,270

(22) Filed: Sep. 13, 2001

(65) Prior Publication Data

US 2002/0089591 A1    Jul. 11, 2002

(30) Foreign Application Priority Data

Sep. 14, 2000    (JP)    ............................. 2000-280563
Sep. 14, 2000    (JP)    ............................. 2000-280564

(51) Int. Cl.
  *H04N 5/225*    (2006.01)
(52) U.S. Cl. ................. 348/373; 348/207.99; 396/439; 396/543
(58) Field of Classification Search ........... 348/207.99, 348/373; 396/439, 543
  See application file for complete search history.

(56) References Cited

U.S. PATENT DOCUMENTS

| | | | | |
|---|---|---|---|---|
| 4,200,381 A | * | 4/1980 | Ishizaka et al. | 396/298 |
| 4,589,757 A | * | 5/1986 | Maitani et al. | 396/223 |
| 5,761,554 A | * | 6/1998 | Kirigaya et al. | 396/299 |
| 5,950,035 A | * | 9/1999 | Sakamoto et al. | 396/543 |
| 6,067,424 A | * | 5/2000 | Shono | 396/297 |
| 6,427,052 B1 | * | 7/2002 | Ogi et al. | 396/222 |
| 6,778,218 B1 | * | 8/2004 | Higuchi et al. | 348/344 |

FOREIGN PATENT DOCUMENTS

JP    5-113408    5/1993

OTHER PUBLICATIONS

Askey, Phil; "Nikon Coolpix 950 Review"; Apr. 1999; http://www.dpreview.com/reviews/nikoncp950/.*
"Digital Sill Camera—DSC-D700"; Sony Corporation; 1998.*

* cited by examiner

*Primary Examiner*—Ngoc-Yen Vu
*Assistant Examiner*—Chriss S. Yoder
(74) *Attorney, Agent, or Firm*—Morgan & Finnegan, LLP

(57) ABSTRACT

It is an object of this invention to provide a setting operation device which can effectively cope with the tendency toward multiple functions and allows a user to easily change and check functions. In order to achieve this object, the device includes a first rotating unit which is rotated/operated to select at least a first upper operation mode and a second upper operation mode, and a second rotating unit which is rotated/operated to select a lower operation mode belonging to the first upper operation mode set by the first rotating unit and a lower operation mode belonging to the second upper operation mode set by the first rotating unit, the second rotating unit being stacked together with the first rotating unit.

2 Claims, 9 Drawing Sheets

FIRST DIAL POSITION : INACTIVE
CONNECTION : A, C, D, G

FIRST DIAL POSITION : PHOTOGRAPHING MODE
CONNECTION : D, G

FIG. 8

| OPERATION MODE | CONNECTION |
|---|---|
| INACTIVE MODE | A, C, D, G |
| PROGRAMMED MODE | D, G |
| TV PRIORITY MODE | D, E, G |
| AV PRIORITY MODE | E, G |
| MANUAL MODE | G |
| SINGLE PLAYBACK MODE | B, C, D, G |
| MULTI-PLAYBACK MODE | B, C, D, E, G |
| MOVING IMAGE PLAYBACK MODE | B, C, E, G |
| ERASE MODE | B, C, G |
| COMMUNICATION MODE | B (D TO G ARE ARBITRARILY SET) |

SETTING OPERATION DEVICE AND ELECTRONIC APPARATUS

FIELD OF THE INVENTION

The present invention relates to a setting operation device for selecting an operation mode and the like in an electronic device such as an electronic camera and an electronic apparatus.

BACKGROUND OF THE INVENTION

In a conventional electronic device, e.g., an electronic camera, a dial is pivoted/operated to select an operation mode such as photographing operation of the camera and playback operation for a photographed image.

Recently, however, with the tendency toward multiple functions in an electronic camera, it has become difficult to indicate all operation modes of the camera on the dial. For this reason, operation modes that cannot be indicated on the dial are set and displayed on a display means such as an LCD that is used together with the dial. For this reason, a user needs to know in advance what types of functions the camera has. In addition, the user must repeatedly switch indications displayed by the display means or repeatedly operate dial to select a given function, and hence he/she cannot quickly change functions.

A general display means such as an LCD consumes a large amount of power. In addition, it is inconvenient for the user to use the display means so as to change and check functions.

SUMMARY OF THE INVENTION

The present invention has been made in consideration of the above situation, and has as its object to provide a setting operation device which can effectively cope with the tendency toward multiple functions and allows a user to easily change and check functions.

It is the second object of the present invention to improve the operability of the setting operation device of an electronic device.

In order to solve the above problem and achieve the above objects, a setting operation device according to the present invention is characterized by having the following arrangement.

There is provided a setting operation device for setting an operation mode, comprising a first rotating unit which is rotated/operated to select at least a first upper operation mode and a second upper operation mode, and a second rotating unit which is rotated/operated to select a lower operation mode belonging to the first upper operation mode set by the first rotating unit and a lower operation mode belonging to the second upper operation mode set by the first rotating unit, the second rotating unit being stacked together with the first rotating unit.

An electronic apparatus according to the present invention is characterized by having the following arrangement.

There is provided an electronic apparatus for setting an operation mode, comprising a first rotating unit which is rotated/operated to select at least a first upper operation mode and a second upper operation mode, and a second rotating unit which is rotated/operated to select a lower operation mode belonging to the first upper operation mode set by the first rotating unit and a lower operation mode belonging to the second upper operation mode set by the first rotating unit, the second rotating unit being stacked together with the first rotating unit.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 8 is a view showing the relationship between the operation modes of the electronic camera and connection among the electrodes.

DETAILED DESCRIPTION OF THE PREFERRED EMBODIMENTS

The preferred embodiments of the present invention will be described below with reference to the accompanying drawings.

(First Embodiment)

Figure 1A:
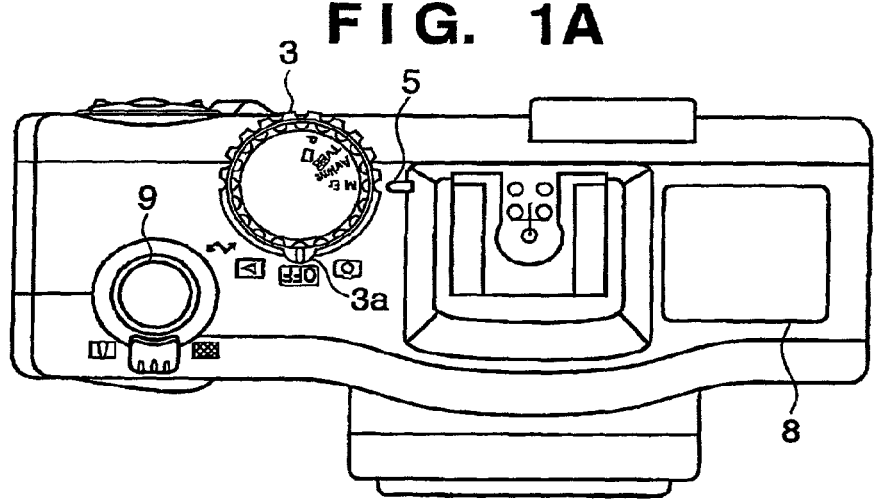
FIGS. 1A and 1B are upper and front views of an electronic camera according to the first embodiment of the present invention.
Figure 1B:
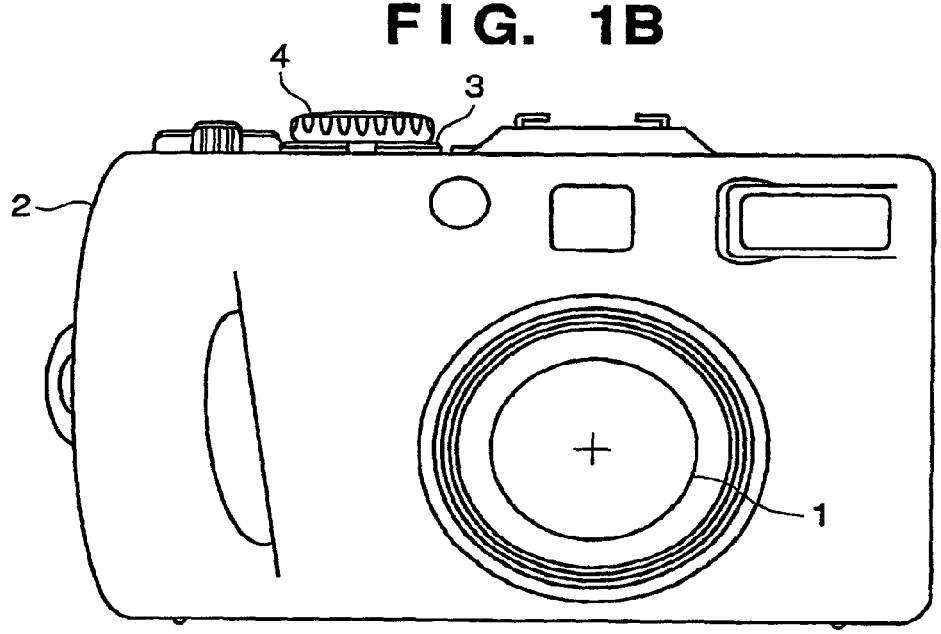

FIGS. 1A and 1B show the front and upper surfaces of an electronic camera according to the first embodiment of the present invention. Referring to FIGS. 1A and 1B, reference numeral 1 denotes a photographic lens; 2, the casing of the electronic camera; and 3, a first mode dial that is pivoted to select an operation mode for the electronic camera, e.g., an inactive mode, photographing mode, or playback mode, and has an index 3a for indicating the currently selected operation mode. The first mode dial 3 protrudes from the casing 2 in the radial direction to allow the user to pivot the dial with his/her finger tip or the like by putting it on the protruding portion.

Reference numeral 4 denotes a second mode dial that is pivoted to select a photograph mode in photograph operation, e.g., an AV priority (aperture priority) mode, TV priority (shutter priority) mode, or programmed mode. The second mode dial 4 is smaller in diameter than the first mode dial 3, and has a pivot center coinciding with the pivot center of the first mode dial 3. The second mode dial 4 is stacked on the first mode dial. Reference numeral 5 denotes an index for indicating the photographing mode selected by the second mode dial 4.

Figure 2:
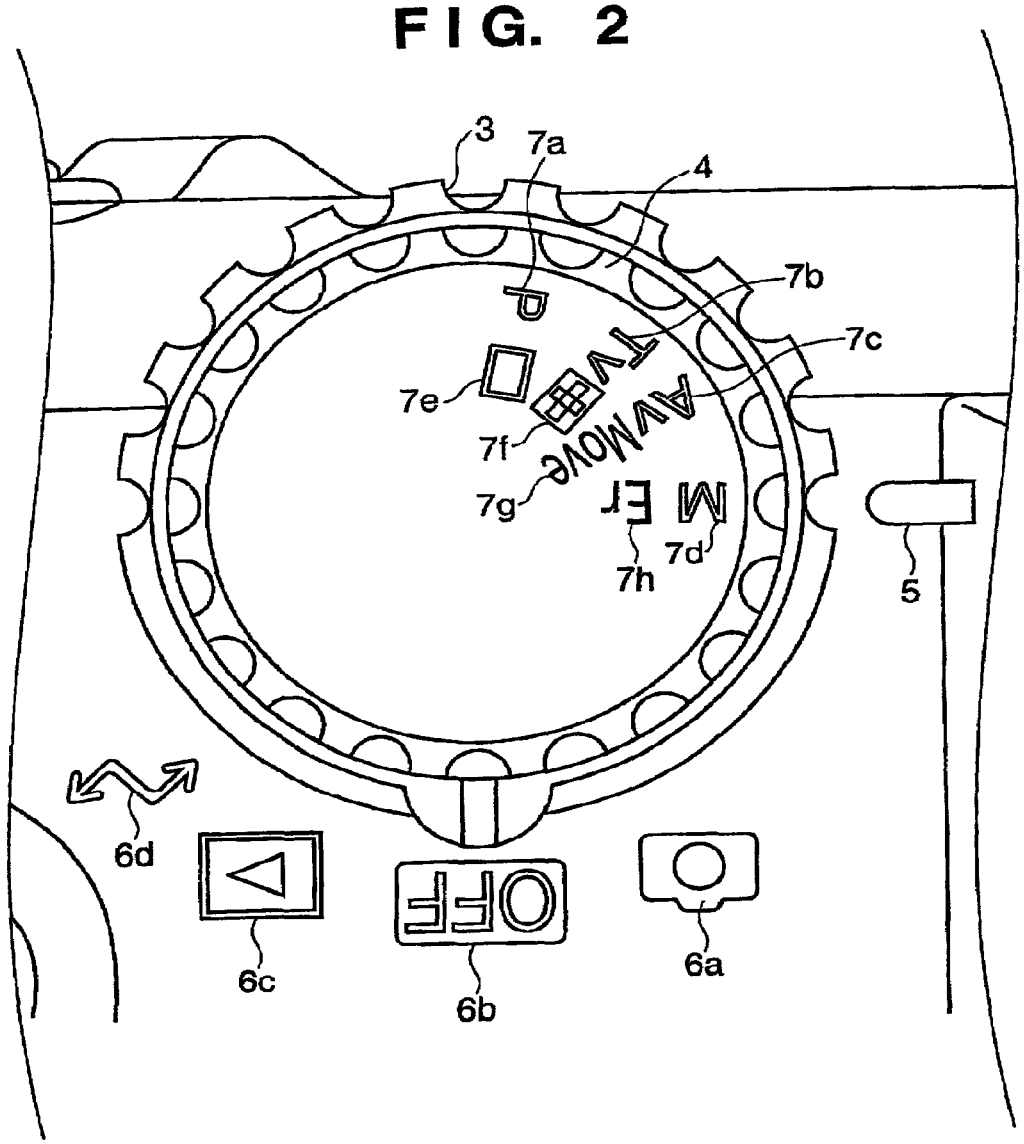
FIG. 2 is an enlarged view of the first and second mode dials of the electronic camera according to the first embodiment of the present invention.

FIG. 2 is an enlarged view of the first mode dial 3 and second mode dial 4. Referring to FIG. 2, reference numeral 6a to 6d denote indications of operation modes that can be selected by the first mode dial 3, which respectively indicate the photographing mode, inactive mode (power OFF), playback mode, and communication mode in different colors.

Reference numerals 7a to 7h denote indications of the contents of photographing modes and playback modes that can be selected by the second mode dial 4. More specifically, reference numeral 7a denotes the programmed photographing mode; 7b, the TV priority mode; 7c, the AV priority mode; and 7d, the manual mode. These modes are displayed in the same color as that of the photographing mode 6a.

Reference numeral. 7e denotes a single playback mode; 7f, a multi-playback mode, 7g, a moving image playback mode, and 7h, an erase mode. These modes are displayed in the same color as the display color of the playback mode 6c.

Referring to FIG. 1, reference numeral 8 denotes an information display unit for displaying information such as a remaining frame count, aperture value, shutter speed, remaining battery capacity, and the like; and 9, a release button that is operated to generate a release signal. Assume that in this embodiment, no lower mode to be selected in the communication mode is set.

Figure 3A:
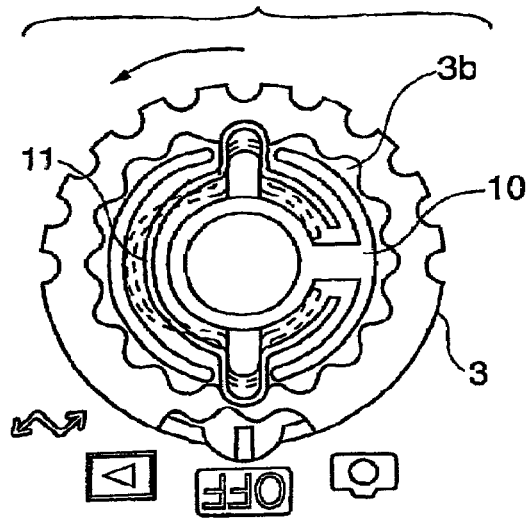
FIGS. 3A to 3C are views showing the internal structure of the first mode dial of the electronic camera according to the first embodiment of the present invention and its function.
Figure 3B:
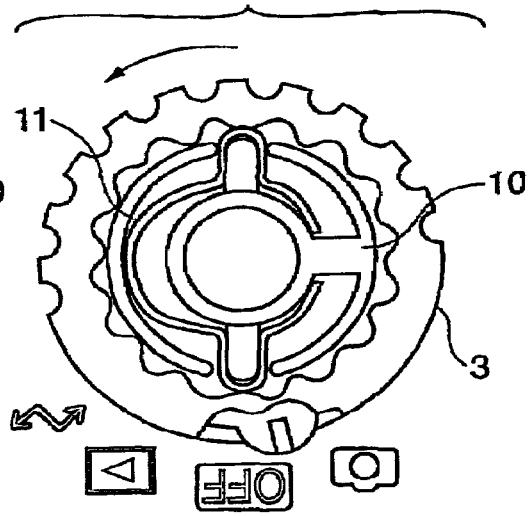
Figure 3C:
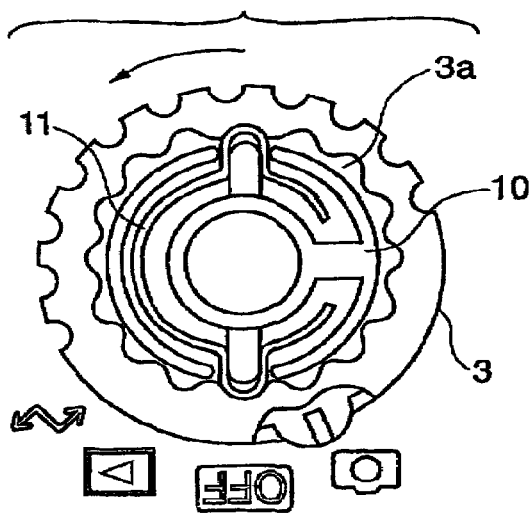

FIGS. 3A to 3C are views showing the internal structure of the first mode dial 3. Referring to FIGS. 3A to 3C, reference numeral 10 denotes a fixing portion which is part of the casing 2 and supports the first mode dial 3; and 11, a leaf spring which is supported by the fixing portion 10 and in contact with a serrated portion 3b formed inside the first mode dial 3.

With the above structure of the first mode dial 3, when the first mode dial 3 is pivoted from the state shown in FIG. 3A in the direction indicated by the arrow, the leaf spring 11 is charged by a projection of the serrated portion 3b, as shown in FIG. 3B. When the first mode dial 3 is further pivoted, the leaf spring 11 comes into contact with the next recess owing to the charging force of the leaf spring 11, as shown in FIG. 3C. As the leaf spring 11 sequentially passes through recesses and projections in this manner, the user can feel clicks when he/she pivots the first mode dial 3. The second mode dial 4 has substantially the same structure as that of the first mode dial 3.

Figure 4:
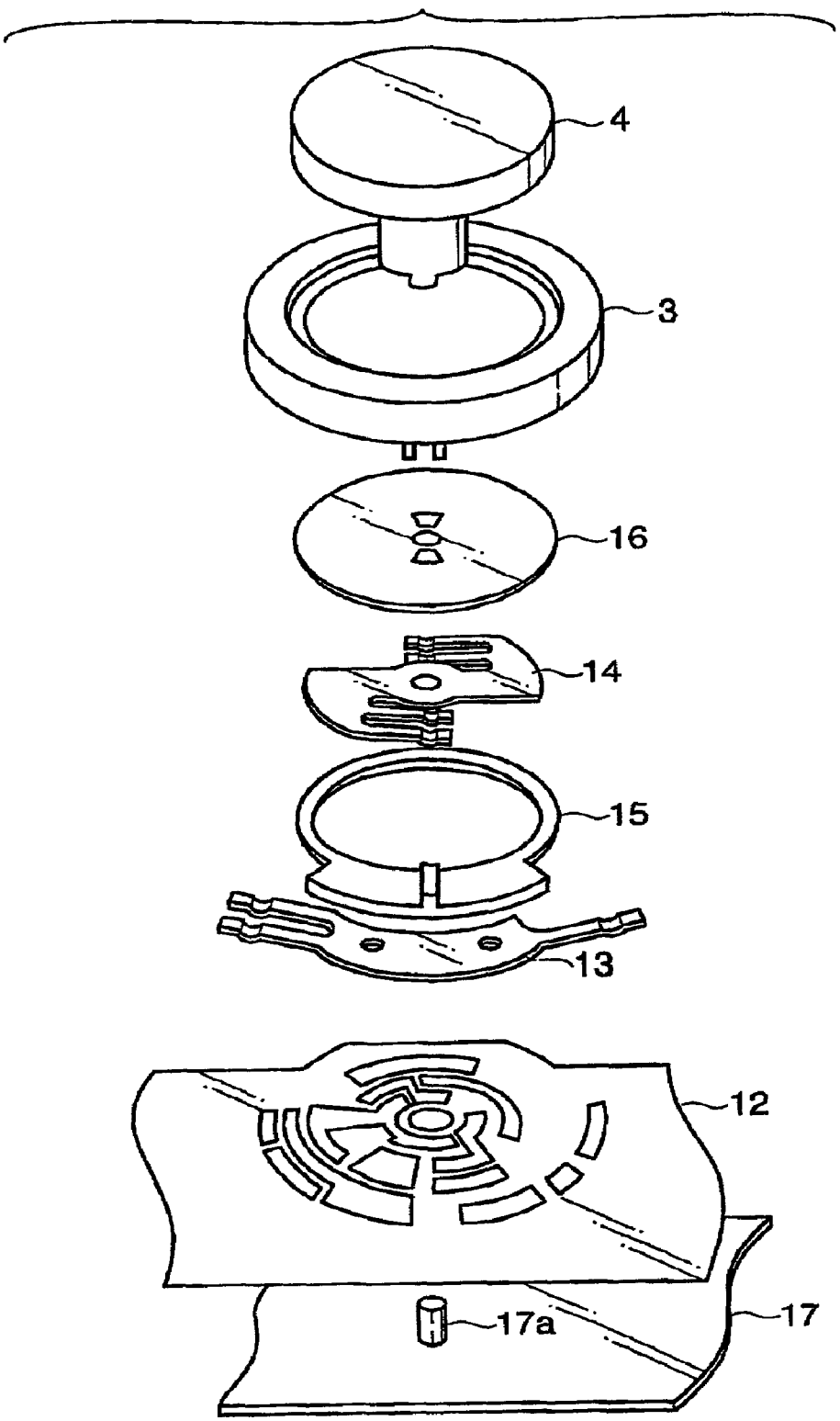
FIG. 4 is an exploded perspective view of the dial portion of the electronic camera according to the first embodiment of the present invention.

FIG. 4 is an exploded perspective view showing the structures of the first mode dial 3 and second mode dial 4 in more detail. Referring to FIG. 4, reference numeral 12 denotes a flexible printed board on which a concentric electrode pattern is drawn around the pivot center of the first mode dial 3 and second mode dial 4; and 13 and 14, contact pieces which are in contact with the electrode pattern on the flexible printed board 12 and fixed on contact piece bases 15 and 16 that pivot about the center of the concentric pattern.

Reference numeral 17 denotes a base plate on which the flexible printed board 12 and contact piece bases 15 and 16 are mounted. The base plate 17 has a pivot shaft 17a on which the contact base 16 is pivoted. The center axis of this pivot shaft 17a coincides with the pivot centers of the first mode dial 3, second mode dial 4, and contact piece bases 15 and 16. The contact piece bases 15 and 16 are respectively engaged with the first mode dial 3 and second mode dial 4, so that as the first and second mode dials 3 and 4 pivot, the bases also pivot in the same manner.

Figure 5A:
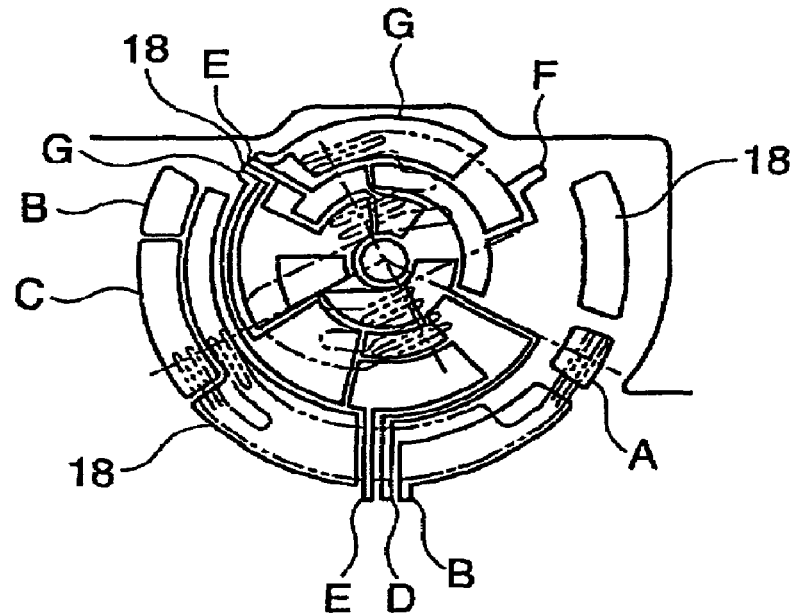
FIGS. 5A and 5B are plan views showing the electrode pattern of the electronic camera according to the first embodiment of the present invention.
Figure 5B:
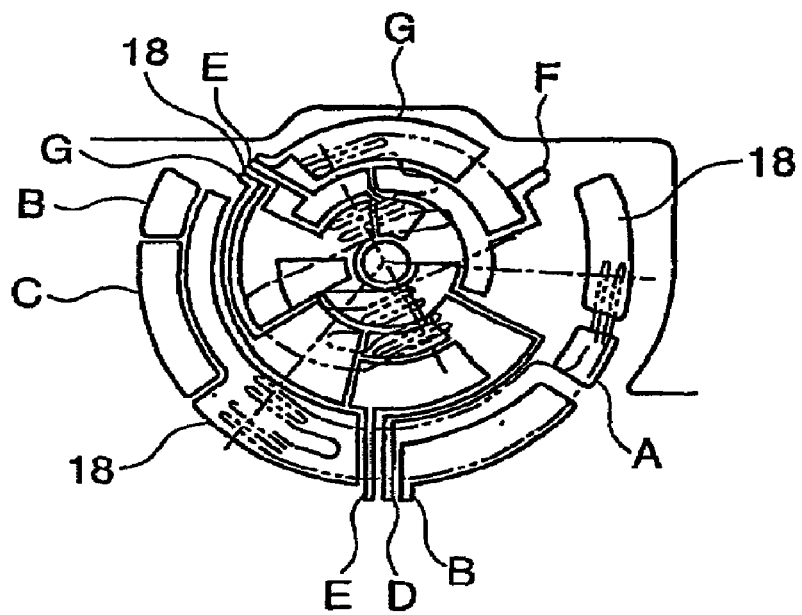

FIGS. 5A and 5B are views for explaining the operation of the electrode pattern on the flexible printed board 12 and contact pieces 13 and 14. Referring to FIGS. 5A and 5B, reference numeral 18 denotes an electrode, and reference symbols A, B, C, D, E, F, and G denote electrodes. The system controller (not shown) of the electronic camera detects connection between the electrode 18 and the electrodes A, B, C, D, E, F, and G. Assume that the contact piece 13 pivots from the state shown in FIG. 5A to the state shown in FIG. 5B as the first mode dial 3 pivots, and connection between the electrodes A, B, and C and the electrode 18 changes. In this case, the system controller changes the inactive mode to the photographing mode.

FIG. 8 shows the relationship between the operation modes of the electronic camera and connection between the electrodes A, B, C, D, E, F, and G and the electrode 18. The system controller (not shown) switches the operation modes in accordance with connection between the electrodes A, B, C, D, E, F, and G and the electrode 18, as shown in FIG. 8.

As described above, in this embodiment, the operation modes are displayed in different colors such that lower photographing modes and playback modes are displayed in colors corresponding to the colors of the corresponding upper operation modes. This allows the user to easily switch the operation modes of the electronic camera and check the current operation mode of the camera.

In this embodiment, the two dials are coaxially stacked on each other. However, the present invention is not limited to this. That is, three or more dials can be coaxially stacked on each other. In this case, more lower operation modes can be set. This allows the user to set operation modes more elaborately.

Figure 6:
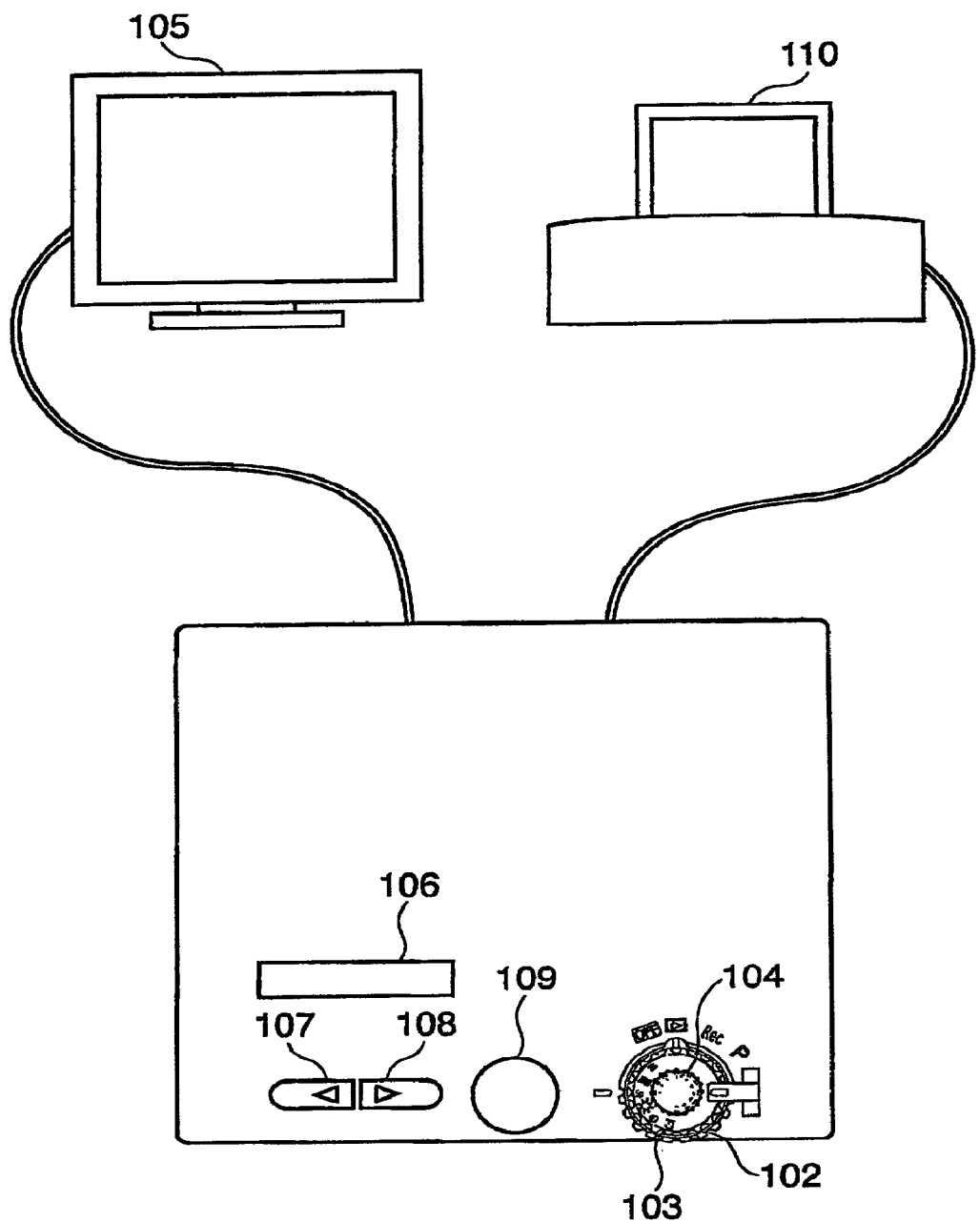
FIG. 6 is a view showing the schematic arrangement of an electronic recording/playback apparatus according to the first embodiment of the present invention.

FIG. 6 is an external view of an electronic image recording/playback apparatus according to an embodiment of the present invention. Referring to FIG. 6, reference numeral 101 denotes an electronic image recording/playback apparatus body including a personal computer and the like; and 102, a first dial for selecting one of operation modes of the electronic image recording/playback apparatus, i.e., the inactive mode, playback mode, record mode, and print mode. Note that the operation mode selected by the first dial 102 will be referred to as a first operation mode. Reference numeral 103 denotes a second dial for selecting one of a standard mode, monotone mode, sharpness change mode, brightness change mode, contrast change mode, and color tone change mode as lower modes in the playback mode, record mode, and print mode which are the first operation modes (to be described later).

Reference numeral 104 denotes a third dial for setting a degree of change when one of the sharpness change mode, brightness change mode, contrast change mode, and saturation change mode is selected by the second dial 103.

Reference numeral 105 denotes a display means for displaying image data and the like; 106, an interface for inputting/outputting image data and the like; 107 and 108, operation units for changing the image data and the like displayed on the display means 105; 109, a decision button for starting to record or print in the record mode or print mode; and 110, a printer for printing information such as an image.

Figure 7:
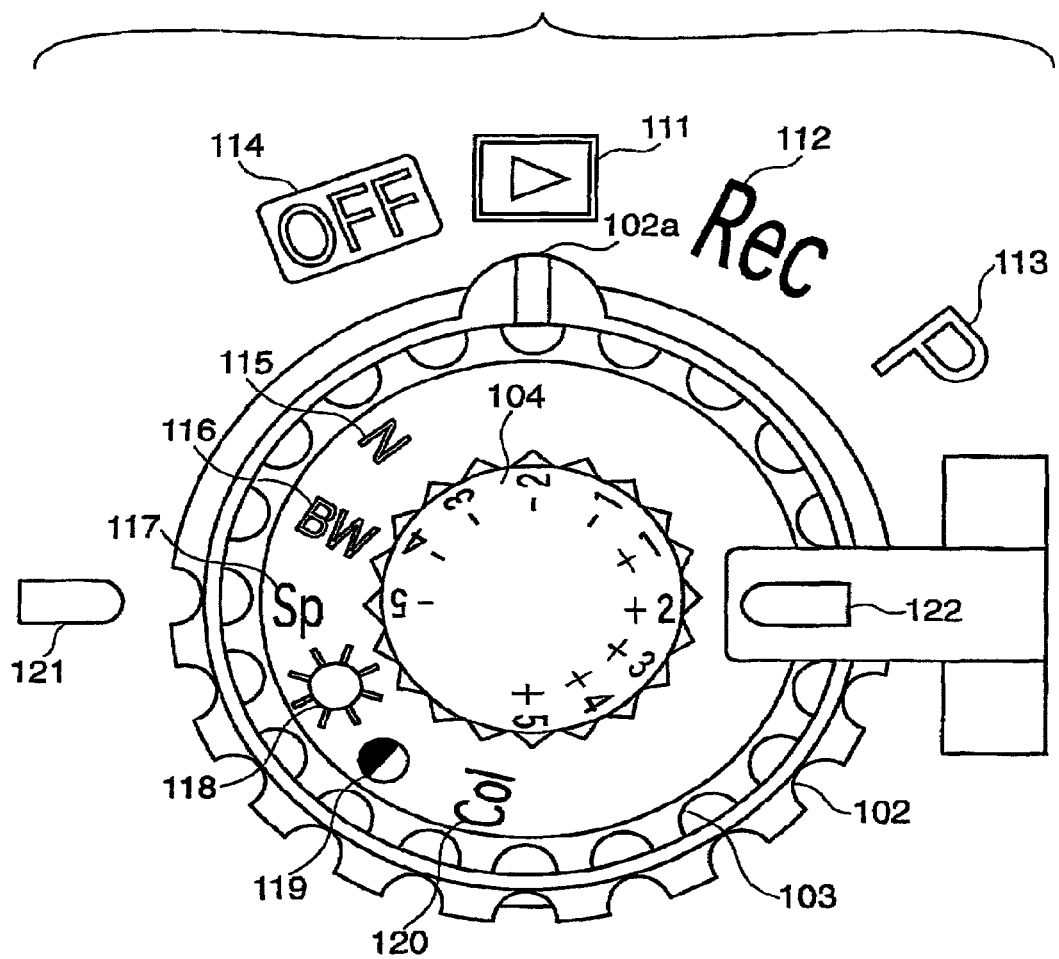
FIG. 7 is an enlarged view of the dial portion of the electronic recording/playback apparatus according to the first embodiment of the present invention.

FIG. 7 is a view showing the first dial 102, second dial 103, and third dial 104 in detail. Referring to FIG. 7, reference numerals 111 to 114 denote the indications of operation modes selected by the first dial 102. More specifically, reference numeral 111 denotes the playback mode of displaying an image or the like; 112, the record mode of recording an image or the like; 113, the print mode of printing an image or the like; and 114, a power OFF indication. In this case, the operation mode in the direction of an index 102a formed on the first dial 102 is selected. For example, in the case shown in FIG. 7, the playback mode is selected.

Reference numerals 115 to 120 denote the indications of the operation modes set by the second dial 103. More specifically, reference numeral 115 denotes the standard mode of playing back, recording, and printing an image or the like with predetermined set values; 116, the monotone mode of playing back, recording, and printing an image or the like by converting it into a monochrome image; 117, the sharpness change mode of playing back, recording, and printing an image or the like upon changing sharpness; 118, the brightness change mode of playing back, recording, and printing an image or the like upon changing brightness; 119, the contrast change mode of playing back, recording, and printing an image or the like upon changing contrast; and 120, the saturation change mode of playing back, recording, and printing an image or the like upon changing saturation.

The third dial 104 becomes effective when one of the sharpness, brightness, contrast, and saturation modes is selected by the second dial 103. Each degree of change is represented by a positive/negative numerical value.

The third dial 104 is located above the second dial 103 and smaller in outer diameter than the second dial 103.

Reference numeral 121 denotes a second index for the second dial 103. The second mode represented by the indication facing the second index 121 (sharpness in FIG. 7) is selected. Reference numeral 122 denotes a third index for the third dial 104. The degree of change in sharpness, brightness, contrast, or saturation is determined in accordance with a numerical value displayed on the third dial 104 which faces this third index 122. In the case shown in FIG. 7, the sharpness of the currently played image or the like is increased by two steps, and the resultant image is displayed on the display means 105.

As described above, according to this embodiment, in the operation mechanism of an electronic device of this type, the operation unit itself indicates an operation mode, and hence the user can easily know the current operation mode. In addition, even if the electronic device is inactive, lower modes can be set in advance. Therefore, when the electronic device is activated, a desired operation state can be quickly set.

Furthermore, since the first operation unit protrudes from the casing of the electronic device and the outer diameter of the second operation units is smaller than that of the first operation unit, the operation of the first operation unit is facilitated. This prevents the user from erroneously operating the second operation unit.

(Second Embodiment)

In the second embodiment, operation pivot angles are set for the first to third operation dials in the first embodiment in such a manner that a larger pivot angle is set for a dial located at a higher level. Since the other arrangements of the second embodiment are the same as those of the first embodiment, only the difference between the first and second embodiments will be described.

In the second embodiment, referring to FIG. 2, the minimum operation angle of a second mode dial 4 is larger than that of a first mode dial 3, and hence the above indications 7a to 7h can be displayed on the dial in proper sizes.

Figure 9A:
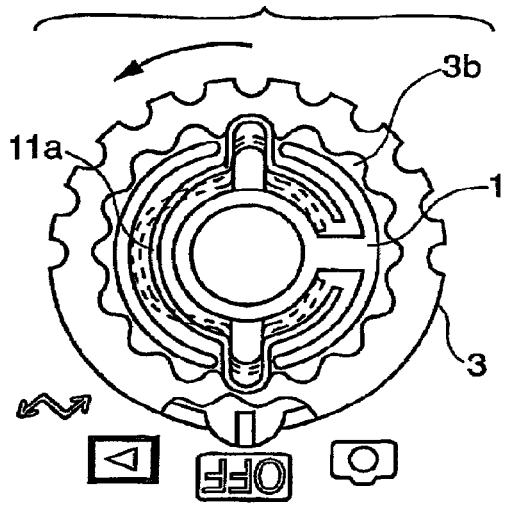
FIGS. 9A to 9D are views showing the internal structure of the first mode dial of the electronic camera according to the second embodiment of the present invention and its function.
Figure 9B:
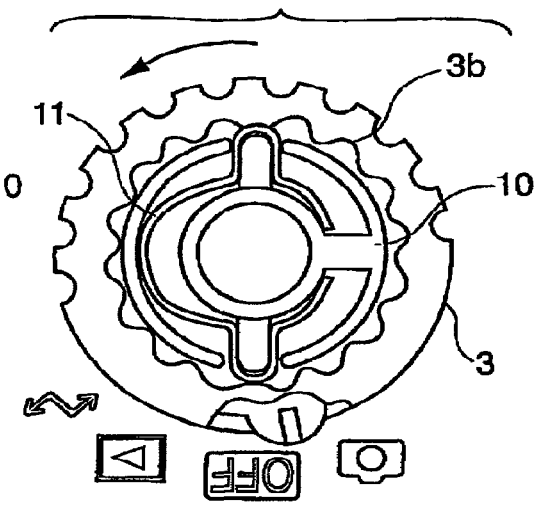
Figure 9C:
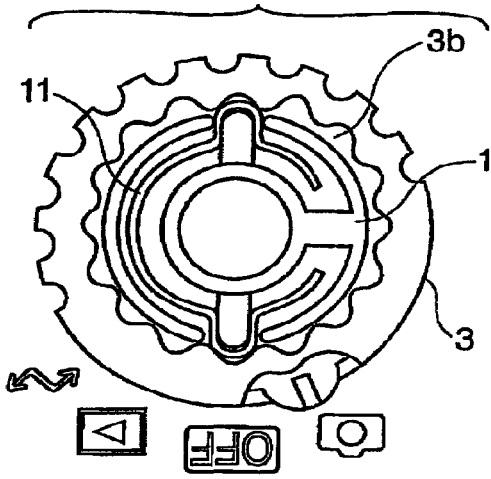

FIGS. 9A to 9C are views showing the internal structure eof the first mode dial 3. Referring to FIGS. 9A to 9C, reference numeral 10 denotes a fixing portion which is part of a casing 2 and supports the first mode dial 3; and 11, a leaf spring which is supported by the fixing portion 10 and in contact with a serrated portion 3b, formed inside the first mode dial 3.

With the above structure of the first mode dial 3, when the first mode dial 3 is pivoted from the state shown in FIG. 9A in the direction indicated by the arrow, the leaf spring 11 is charged by a projection of the serrated portion 3b, as shown in FIG. 9B. When the first mode dial 3 is further pivoted, the leaf spring 11 comes into contact with the next recess owing to the charging force of the leaf spring 11, as shown in FIG. 9C. As the leaf spring 11 sequentially passes through recesses and projections in this manner, the user can feel clicks when he/she pivots the first mode dial 3.

Figure 9D:
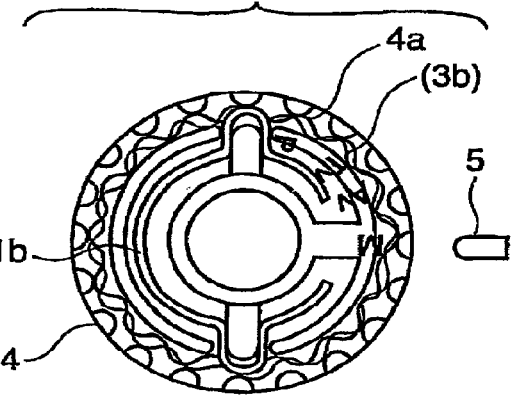

The second mode dial 4 also has substantially the same structure as the first mode dial 3. However, as shown in FIG. 9D, the period of a serrated portion 4a formed on the second mode dial 4 is longer than that of the serrated portion 3b of the first mode dial 3. The pivot angle at which the leaf spring 11 pivots upon climbing over one projection of the serrated portion is larger than that in the case of the first mode dial 3.

By setting the pitch of the serrated engaging portion of the second mode dial 4 to be smaller than that of the serrated engaging portion of the first mode dial 3, the pivot angle required for the operation of the second mode dial 4 can be set to be larger than that for the first mode dial 3. This makes it possible to ensure a large mode display portion on the second mode dial 4 and improve its visibility.

According to the second embodiment, in the electronic image recording/playback apparatus shown in FIG. 6 as well, the minimum operation angle of a first dial 102 is set to be smaller than that of a second dial 103, and the minimum operation angle of the second dial 103 is set to be smaller than that of a third dial 104.

As described above, according to the second embodiment, in the operation mechanism of an electronic device of this type, the operation unit itself indicates an operation mode, and hence the user can easily know the current operation mode. In addition, even if the electronic device is inactive, lower modes can be set in advance. Therefore, when the electronic device is activated, a desired operation state can be quickly set. In addition, since a larger operation angle is set for a operation dial located at a higher level, a sufficiently large size can be ensured for an indication indicating the operation mode to be changed on the upper side.

Furthermore, since the first operation unit protrudes from the casing of the electronic device and the outer diameter of the second operation units is smaller than that of the first operation unit, the operation of the first operation unit is facilitated. This prevents the user from erroneously operating the second operation unit.

The present invention is not limited to the above embodiments and various changes and modifications can be made within the spirit and scope of the present invention. Therefore, to apprise the public of the scope of the present invention, the following claims are made.

What is claimed is:

1. An electronic apparatus for setting an operation mode, comprising:

a first rotating unit which is rotated/operated to select at least a first upper operation mode and a second upper operation mode;

a second rotating unit which is rotated/operated to select a lower operation mode belonging to the first upper operation mode set by said first rotating unit and a lower operation mode belonging to the second upper operation mode set by said first rotating unit, said second rotating unit being stacked together with said first rotating unit; and a third rotating unit which is rotated/operated to select another lower operation mode belonging to the lower operation mode which is set by said second rotating unit and belongs to the first upper operation mode, and another lower operation mode belonging to the lower operation mode which is set by said second rotating unit and belongs to the second upper operation mode, said third rotating unit being stacked together with said first and second rotating units, wherein a rotational angle required for said second rotating unit to set the lower operation mode is larger than a rotational angle required for said first rotating unit to set the upper operation mode, and wherein functions of lower operation modes which are selectable by said second rotating unit when the first upper operation mode is selected are different from functions of lower operation modes which are selectable by said second rotating unit when the second upper operation mode is selected.

2. The apparatus according to claim 1, further comprising an image sensing apparatus.

* * * * *